United States Patent
Sercel et al.

(10) Patent No.: US 8,450,641 B2
(45) Date of Patent: May 28, 2013

(54) LASER MACHINING SYSTEMS AND METHODS WITH MOVING LASER SCANNING STAGE(S) PROVIDING FORCE CANCELLATION

(75) Inventors: Jeffrey P. Sercel, Hollis, NH (US); Marco Mendes, Manchester, NH (US); Terrence A. Murphy, Jr., Pembroke, NH (US); Lawrence F. Roberts, Londonderry, NH (US); Paul Szczapa, Plaistow, NH (US)

(73) Assignee: IPG Microsystems LLC, Manchester, NH (US)

( * ) Notice: Subject to any disclaimer, the term of this patent is extended or adjusted under 35 U.S.C. 154(b) by 784 days.

(21) Appl. No.: 12/576,497

(22) Filed: Oct. 9, 2009

(65) Prior Publication Data

US 2010/0089884 A1   Apr. 15, 2010

Related U.S. Application Data

(60) Provisional application No. 61/104,435, filed on Oct. 10, 2008.

(51) Int. Cl.
*B23K 26/00* (2006.01)

(52) U.S. Cl.
USPC .................. 219/121.72; 219/121.69

(58) Field of Classification Search
USPC ........................ 219/121.72, 121.69
See application file for complete search history.

(56) References Cited

U.S. PATENT DOCUMENTS

| | | | |
|---|---|---|---|
| 5,504,407 A | | 4/1996 | Wakui et al. |
| 5,739,502 A | | 4/1998 | Anderson et al. |
| 5,854,460 A | * | 12/1998 | Graf et al. ............... 219/121.67 |
| 6,008,943 A | | 12/1999 | Metelitsa |
| 6,028,376 A | | 2/2000 | Osanai et al. |
| 6,087,625 A | * | 7/2000 | Iso ............................ 219/121.8 |
| 6,396,566 B2 | | 5/2002 | Ebinuma et al. |
| 6,430,465 B2 | | 8/2002 | Cutler |
| 6,531,867 B1 | | 3/2003 | Greene et al. |

(Continued)

FOREIGN PATENT DOCUMENTS

| DE | 102007060658 | 7/2009 |
|---|---|---|
| GB | 2457720 | 8/2009 |

(Continued)

OTHER PUBLICATIONS

International Search Report and Written Opinion dated Dec. 10, 2009 issued in related International Patent Application No. PCT/US2009/060182.

(Continued)

*Primary Examiner* — Zandra Smith
*Assistant Examiner* — Jamie C Niesz
(74) *Attorney, Agent, or Firm* — Grossman Tucker Perreault & Pfleger, PLLC

(57) ABSTRACT

Laser machining systems and methods may use one or more moving laser scanning stages with force cancellation. The force cancellation is provided by moving masses linearly with equal and opposition motion. One or more of the masses may be a laser scanning stage. The laser machining systems may be used to scribe one or more lines in large flat workpieces such as solar panels. In particular, laser machining systems and methods may be used to scribe lines in thin film photovoltaic (PV) solar panels with accuracy, high speed and reduced cost.

21 Claims, 11 Drawing Sheets

U.S. PATENT DOCUMENTS

| | | | |
|---|---|---|---|
| 6,586,707 | B2 | 7/2003 | Boyle et al. |
| 6,774,340 | B1 | 8/2004 | Chiba et al. |
| 6,781,138 | B2 | 8/2004 | Novak et al. |
| 6,909,735 | B2 | 6/2005 | Lizotte et al. |
| 6,917,412 | B2 | 7/2005 | Poon et al. |
| 6,919,530 | B2 | 7/2005 | Borgeson et al. |
| 7,067,763 | B2 | 6/2006 | Schramm |
| 7,321,418 | B2 | 1/2008 | Sasaki et al. |
| 7,324,867 | B2 | 1/2008 | Dinauer |
| 2002/0003616 | A1 | 1/2002 | Ebinuma et al. |
| 2002/0017511 | A1 | 2/2002 | Kling |
| 2002/0056891 | A1* | 5/2002 | Wu ............................ 257/620 |
| 2002/0060210 | A1* | 5/2002 | Terada et al. ............ 219/121.76 |
| 2003/0075529 | A1 | 4/2003 | Mazumder et al. |
| 2003/0127441 | A1 | 7/2003 | Haight et al. |
| 2004/0238507 | A1 | 12/2004 | Schadler |
| 2005/0247683 | A1 | 11/2005 | Agarwal et al. |
| 2005/0274703 | A1 | 12/2005 | Kawakita et al. |
| 2006/0289412 | A1* | 12/2006 | Hamada ................. 219/121.75 |
| 2007/0103660 | A1* | 5/2007 | Tanaka ............................ 355/53 |
| 2007/0193990 | A1 | 8/2007 | Richerzhagen et al. |
| 2008/0012189 | A1 | 1/2008 | Manz |
| 2008/0067160 | A1 | 3/2008 | Suutarinen |
| 2008/0099452 | A1 | 5/2008 | Akiyama et al. |
| 2008/0105295 | A1 | 5/2008 | Manz |
| 2008/0183332 | A1* | 7/2008 | Ohm et al. .................... 700/250 |
| 2008/0192322 | A1 | 8/2008 | Scaggs et al. |
| 2009/0000108 | A1 | 1/2009 | Manz |

FOREIGN PATENT DOCUMENTS

| | | |
|---|---|---|
| WO | 2007078512 | 7/2007 |
| WO | 2009030409 | 3/2009 |
| WO | 2009098459 | 8/2009 |
| WO | 2009103946 | 8/2009 |
| WO | 2009103964 | 8/2009 |
| WO | 2009126899 | 10/2009 |

OTHER PUBLICATIONS

International Search Report and Written Opinion dated Dec. 3, 2009 issued in related International Patent Application No. PCT/US2009/060188.

International Search Report and Written Opinion dated Dec. 10, 2009 issued in related International Patent Application No. PCT/US2009/060228.

Photon International, "Focusing on Lasers," Sep. 2009, p. 208.

Schulze, et al, "Laser Direct Machining—Diversity is Key," Mikromaterialbearbeitung, LTJ Mar. 2008, Nr. 2, p. 38-39.

Dunsky, et al., "Scribing thin-film solar panels," (Feb. 2008) available at http://205.157.169.116/display_article/318855/39/ARCHI/none/Feat/Scribing-thin-film-solar-panels, retrieved on Sep. 3, 2008 (3 pages).

Dunsky, "Lasers in the solar energy revolution," (Aug. 2007) available at http://www.coherent.com/Downloads/70410-186e-ILS.pdf, retrieved on Sep. 3, 2008 (3 pages).

International Search Report and Written Opinion dated Mar. 31, 2010 issued in related International Patent Application No. PCT/US2009/060153.

Westin, "Optimisation of Laser Scribing of Back Contact for Pholovoltaic Modules," Master of '-44 Science Program. Department of Applied Physics and Mechanicai Engineering Lulea University of Technology. 2005:102 CIV, ISSN: 1402-1617, ISRN; LTU-EX—05/102—SE. (2005).

* cited by examiner

LASER MACHINING SYSTEMS AND METHODS WITH MOVING LASER SCANNING STAGE(S) PROVIDING FORCE CANCELLATION

CROSS-REFERENCE TO RELATED APPLICATION

The present application claims the benefit of U.S. Provisional Patent Application Ser. No. 61/104,435, filed Oct. 10, 2008, which is fully incorporated herein by reference.

TECHNICAL FIELD

The present invention relates to machining and more particularly, to laser machining systems and methods with moving laser scanning stages providing force cancellation.

BACKGROUND INFORMATION

Laser machining systems and methods are commonly used to machine various types of materials and structures. Such laser machining systems and methods may provide a number of advantages including lower manufacturing costs, increased throughput and production yield, and improved quality. In the area of solar panels, for example, the advantages of laser machining could significantly enhance the efficiency and viability of solar energy technology.

In the manufacture of thin film photovoltaic (PV) solar panels, laser machining techniques may be used to scribe the various thin film layers in a panel to form electrically connected cells. In one type of PV solar panel, three layers are deposited to form the panel and lines are scribed after each new deposition. The area on the panel including these lines is considered a wasted area that does not contribute to solar energy conversion. Thus, the lines should be straight and aligned accurately to minimize this wasted area and to provide the best efficiency. High scribing speeds and increased throughput are also desirable. Providing accurate high speed scribing of thin film PV solar panels (and other similar structures) presents a number of unique challenges.

In particular, vibrations and/or forces generated by and/or transmitted to the laser machining system may adversely affect the machining precision and speed. Passive isolation techniques may be used to decouple the processing area of a machine from the floor. Isolators are often placed between the machine frame and a granite base that supports the processing area components. However, the laser machining of scribe lines in solar panels involves the translation of the optical head and/or the solar panel. When these components move relative to the granite base, forces are transmitted to the granite base and reaction forces can cause parasitic errors in the precision of the machining. In other words, the granite base sways back and force and the reaction forces may be transmitted back into the optical head. Waiting for these reaction forces to subside can significantly slow the machining process. Although various force transfer and cancellation techniques have been used with motion stages, these existing techniques may not be suitable for laser machining applications in which high speed, accuracy and high throughput is desired.

BRIEF DESCRIPTION OF THE DRAWINGS

These and other features and advantages will be better understood by reading the following detailed description, taken together with the drawings wherein.

DETAILED DESCRIPTION

Laser machining systems and methods, consistent with various embodiments described herein, may use one or more moving laser scanning stages with force cancellation. The force cancellation is provided by moving masses linearly with equal and opposition motion. One or more of the masses may be a laser scanning stage. The laser machining systems may be used to scribe one or more lines in large flat workpieces such as solar panels. In particular, laser machining systems and methods may be used to scribe lines in thin film photovoltaic (PV) solar panels with accuracy, high speed and reduced cost. Various embodiments of such laser machining systems and methods are described in greater detail below.

As used herein, "machining" refers to any act of using laser energy to alter a workpiece and "scribing" refers to the act of machining a line on a workpiece by moving the laser and/or the workpiece linearly. Machining may include, without limitation, laser ablation scribing where the laser energy causes the material of the workpiece to ablate, laser recrystallization scribing where the laser energy causes the material of the workpiece to melt and recrystallize, and laser stealth scribing where the laser energy focused internally in the workpiece causes the workpiece to crack internally. As used herein, "flat" means having little curvature but not necessarily planar. As used herein, terms such as "substantially," "about," and "approximately" mean within acceptable tolerances. Various components of the laser machining systems described herein may also be used in systems for machining workpieces having other shapes.

Figure 1:
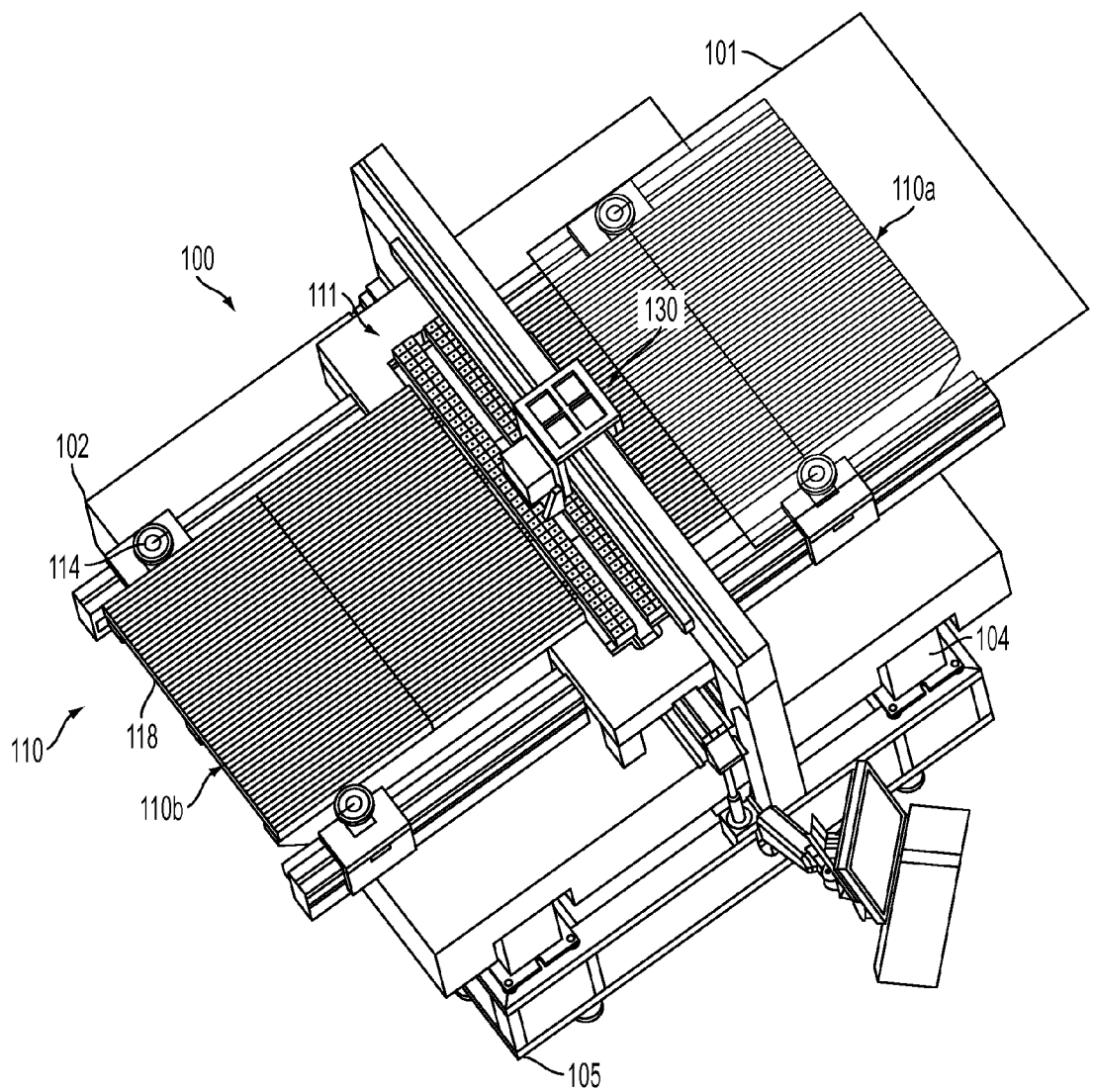
FIG. 1 is a top perspective view of a laser machining system, consistent with an embodiment.
Figure 2:
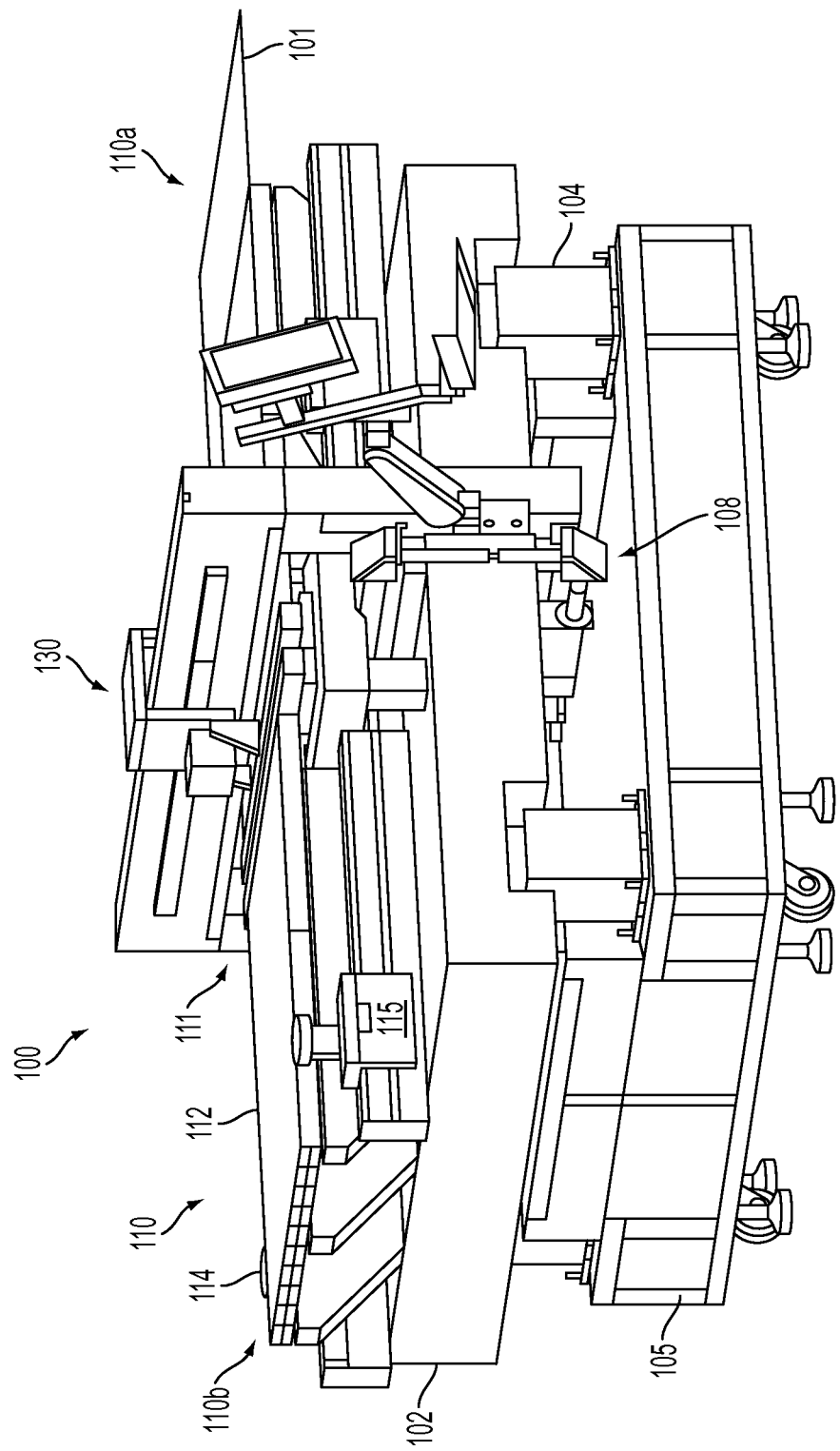
FIG. 2 is a partially cross-sectional perspective view of the laser machining system shown in FIG. 2 taken along an X axis.
Figure 3:
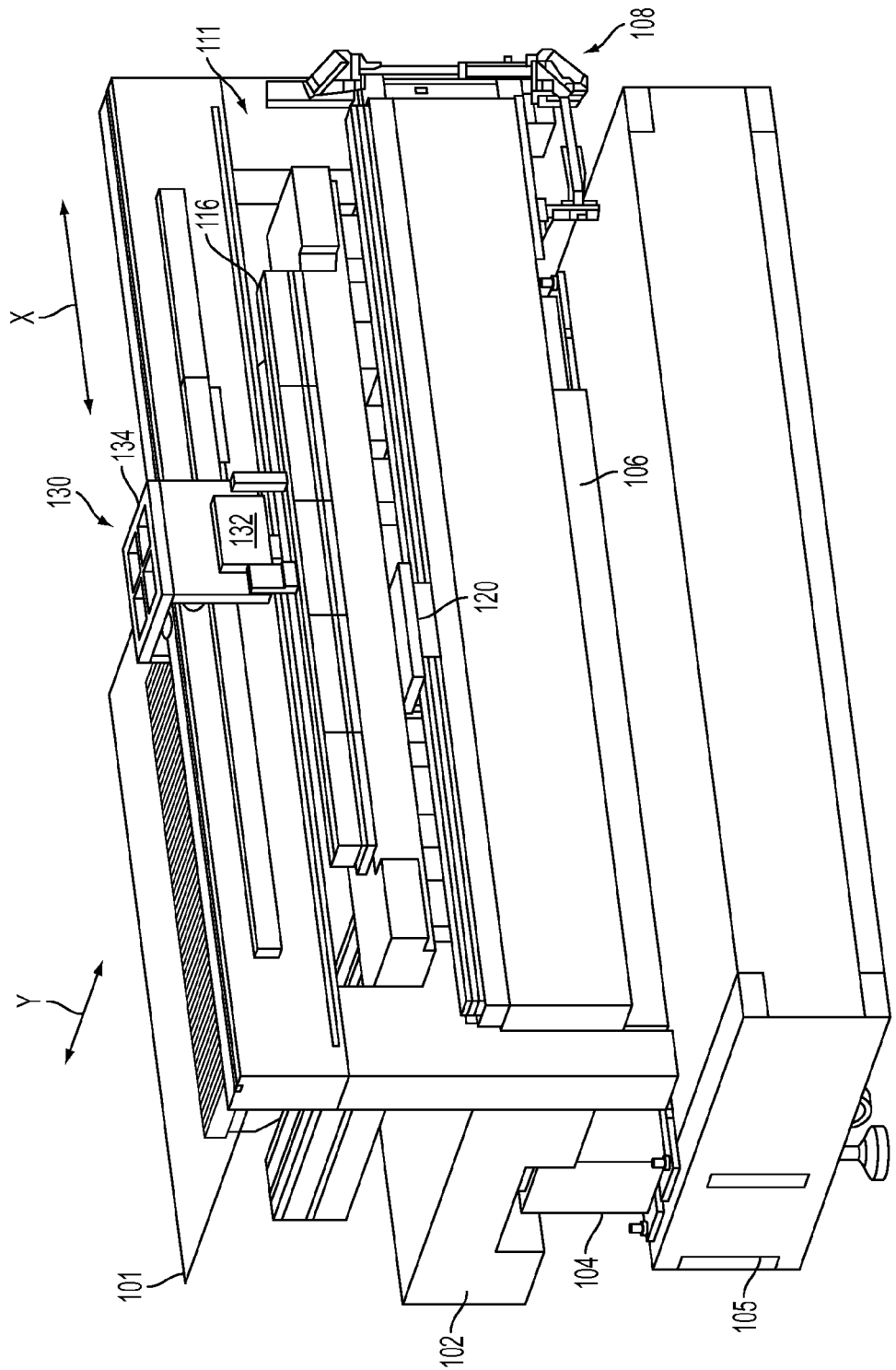
FIG. 3 is a partially cross-sectional perspective view of the laser machining system shown in FIG. 2 taken along a Z axis.

Referring to FIGS. 1-3, one embodiment of a laser machining system 100 is shown and described, which may include a multiple beamlet laser beam delivery system. The laser machining system 100 may include a base 102, such as a granite base, which is supported by a passive vibration isolation system 104. The base 102 may support and provide stability for various components of the laser machining system 100, such as a part handling system, optical heads, motion stages, and motion control systems, as described in greater detail below. The passive vibration isolation system 104 may include four passive isolators at each corner of the base 102 to isolate the laser machining system 100 from vibrations that may travel along the floor. In the illustrated embodiment, the isolators are positioned between the base 102 and a frame 105.

The laser machining system 100 may include a part handling system 110 for supporting a part or workpiece 101 and one or more laser scanning stages 120 supporting one or more optical heads (not shown) that direct one or more laser beams at the workpiece 101. The part handling system 110 may include an infeed section 110a and an outfeed section 110b on opposite sides of a process section 111. The part handling system 110 provides a workpiece support surface 112 for supporting the workpiece 101 and includes a motion control system for controlling motion of the workpiece along a workpiece axis (e.g., Y axis), for example, to index the workpiece 101 through the process section 111. In particular, the infeed section 110a may include an infeed conveyor and the outfeed section 110b may include an outfeed conveyor. The infeed section 110a moves the workpiece 101 into the process section 111 and the outfeed section 110b moves the workpiece 101 out of the process section 111.

In one embodiment, the part handling system 110 and workpiece support surface 112 may be capable of handling and supporting large panels (e.g., 1 m or greater across), such as the type used in thin film solar panels. One embodiment of the part handling system 110 may include one or more vacuum pucks or grippers 114 to hold the workpiece 101 (e.g., large glass panels of a solar panel) and positioning stage(s) to move the grippers 114. One or more of the vacuum grippers 114 may be mounted on an air bearing carriage 115 and may be independently controlled by an air bearing system to allow rotational control of the workpiece 101 for precision alignment. A stationary vacuum puck 116 may also hold the workpiece 101 in position during scribing in the process section 111. An air bearing conveyor 118 may also be used to provide high speed indexing of the workpiece 101 during processing.

In the process section 111, the laser scanning stage(s) 120 may be coupled to a laser scanning stage motion control system for moving the laser scanning stage(s) 120 linearly along one or more scanning axes (e.g., X axis). The scanning stage 120 (and optical head) may be positioned below the workpiece support surface 112 (and thus under the workpiece 101) such that the optical head directs the beam(s) upwardly at the workpiece 101 while the scanning stage 120 moves linearly along the scanning axis. The scanning stage 120 and motion control system may include a high speed precision air bearing system, for example, capable of speeds up to about 2.5 m/sec or greater. A force cancellation technique or mechanism may be used to cancel or minimize reaction forces caused by the movement of the scanning stage(s) 120 and optical head(s). Examples of force cancellation techniques and mechanisms that may be used are described in greater detail below.

The laser machining system 100 also includes one or more laser sources 106 that generate one or more raw laser beams and a beam delivery system that modifies and routes laser beam(s) to the workpiece 101. The laser wavelength may be selected based on the layer and type of material to be scribed and may include, for example, wavelengths of 1064 nm, 352 nm, 355 nm, or 266 nm. The laser source(s) 106 may be located below the base 102 and may be mounted on a fast access service module to minimize down time during service intervals. The beam delivery system may modify the beam by controlling the shape, size, uniformity and/or strength of the beam that is routed to the workpiece 101.

The beam delivery system may include a stationary segment 108 located on the frame 105 and/or base 102 and a movable segment located on or in the moveable optical head (not shown) on the laser scanning stage(s) 120. The stationary segment 108 of the beam delivery system may include, for example, a series of lenses, mirrors and/or reflectors, used to direct the laser beam(s) from the laser source 106 into the movable segment of the beam delivery system. The minors or reflectors in the stationary segment 108 of the beam delivery system may be fast steering mirrors that are capable of changing the direction of the beam(s) directed into the optical heads, which may be used for beam tracking and/or for locking the laser to improve pointing stability.

The stationary segment 108 of the beam delivery system may also include a beam expander for expanding the beam and a power meter for measuring a power of the beam. The beam expander can change both the shape and the size of the beam and may include an arrangement of spherical lenses that allow for independent adjustment of both beam expansion ratio and divergence compensation. The power meter may be retractable, for example, using a pneumatic actuator, such that the power meter may be moved into the path of the beam to measure power readings. A retractable beam stop may also be moved into and out of the beam path (e.g., using pneumatic actuator). The retractable beam stop may include a mirror that redirects the beam into a water cooled beam dump to prevent the beam from passing into the optical head.

As will be described in greater detail below, the moveable segment of the beam delivery system receives a laser beam, modifies the laser beam, and directs one or more modified laser beams to the workpiece. In one embodiment, the beam delivery system splits a beam into multiple beamlets to scribe multiple lines simultaneously to get a higher throughput and uses homogenizers and/or imaging optics to make the beam less sensitive to angular pointing instability and to improve accuracy.

The laser machining system may also include a debris control system 130 for collecting and removing debris generated by machining the workpiece 101. In particular, the debris control system 130 may remove debris generated from scribing toxic materials, such as GaAs, and other materials used in thin film solar panels. The debris control system 130 may include a movable debris collection module or head 132 mounted on a debris control motion stage 134 above the workpiece support surface for linear movement with the laser scanning stage 120 and optical head. The debris control motion stage 134 may be controlled by a motion control system and slaved to the motion of the scanning stage 120. In particular, the debris control motion stage 134 may be an air bearing linear motor driven stage.

The laser machining system 100 may further include air filtration systems and outgassing systems to filter and recycle air within the enclosure. An enclosure (not shown) may be located around the laser machining system 100 and air filtration systems (not shown) may be located on the enclosure. The air filtration systems filter the air to remove harmful gases and direct the filtered air back into the processing area within the enclosure. Examples of debris control and extraction systems and methods that may be used are described in greater detail in U.S. patent application Ser. No. 12/576,963 entitled LASER MACHINING SYSTEMS AND METHODS WITH DEBRIS EXTRACTION, which is filed concurrently herewith and fully incorporated herein by reference.

The laser machining system 100 may also include tracking systems and/or vision inspection systems (not shown) for precision alignment of the workpiece prior to scribing and/or for tracking and/or inspection during and/or after scribing. One or more sensors or inspection cameras may be mounted on the debris control motion stage 134 or another motion stage that moves with the laser scanning stage 120. The laser machining system may also include computerized control systems including control software that integrates the laser, motion control, digital input/output, tracking, and optional machine vision inspection. Examples of tracking and vision correction systems and methods that may be used are described in greater detail in U.S. patent application Ser. No. 12/576,508 entitled LASER MACHINING SYSTEMS AND METHODS WITH VISION CORRECTION AND/OR TRACKING, which is filed concurrently herewith and fully incorporated herein by reference.

Figure 4A:
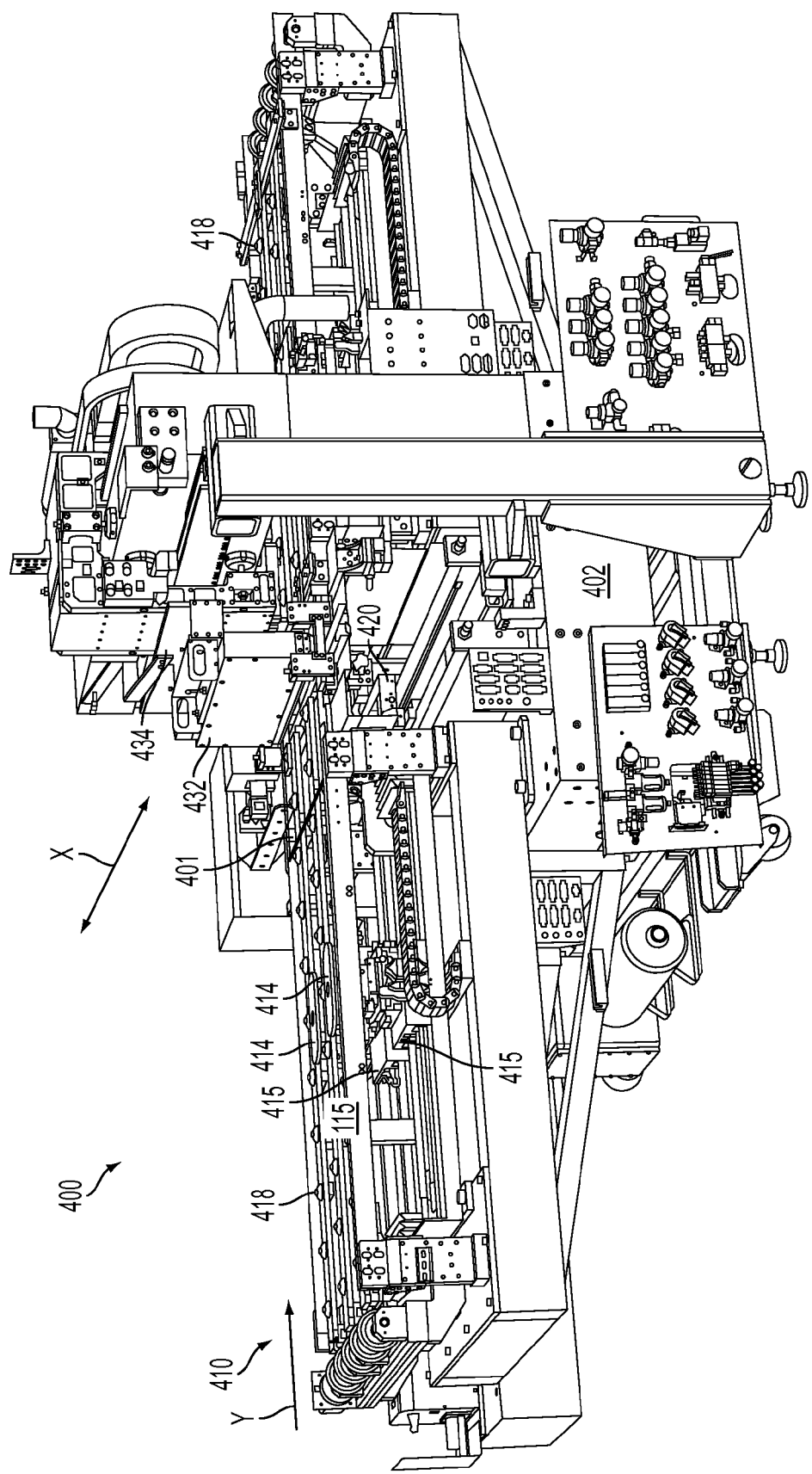
FIGS. 4A and 4B are front and back perspective views of a laser machining system, consistent with another embodiment.
Figure 4B:
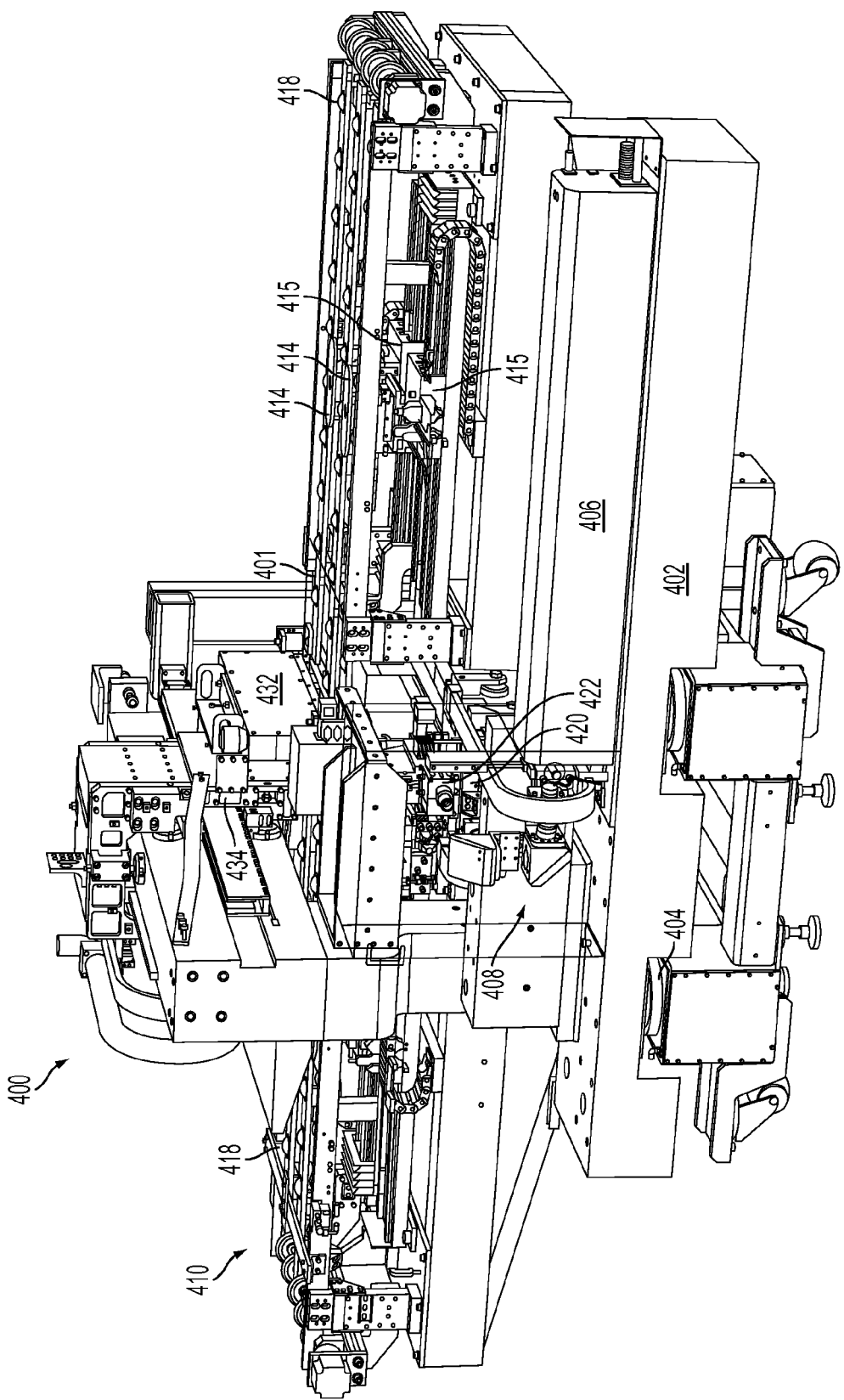

Referring to FIGS. 4A and 4B, another embodiment of a laser machining system 400 is shown and described. The laser machining system 400 may include a base 402 supported by passive vibration isolators 404. The base 402 may support and provide stability for various components of the laser machining system 400, such as a part handling system, optical heads, motion stages, and motion control systems.

In this embodiment, the part handling system 410 for supporting and moving the workpiece 401 includes vacuum grippers 414 for gripping the workpiece 401 and rollers 418 for supporting the workpiece 401. The vacuum grippers 414 are supported on motion stages 415 capable of moving the workpiece 401 along the indexing axis (i.e., the Y axis) to index the workpiece 401 through the processing section. The motion stages 415 may also move the grippers 414 along the scanning axis (i.e., the X axis), for example, to rotate the workpiece 401.

This embodiment of the laser machining system 400 includes a laser scanning stage 420 and optical head 422 located below the workpiece 401 for movement along the scanning axis. A laser source 406 mounted on the base 402 generates a laser beam, and a stationary beam delivery system 408 delivers the beam into the moving optical head 422.

This embodiment of the laser machining system 400 further includes a debris collection hood 432 mounted on the top side opposite the optical head 422. The debris collection hood 432 is fixed and extends across the width of the workpiece 401 to collect debris from the top side of the workpiece 401 as the optical head 422 scans and machines the workpiece 401 from the bottom side.

The laser machining system 400 also includes a scanning stage 434 positioned above the workpiece 401, which allows the system 400 to be retrofitted for top side machining. For example, the optical head may be mounted on the scanning stage 434 and directed downward toward the workpiece 401. In a top side machining configuration, a moving debris collection hood may be mounted on the top side for movement with the optical head such that the debris is extracted as the workpiece is machined. FIGS. 4A and 4B show the system 400 configured for bottom side machining and thus the top side scanning stage 434 is fixed.

Figure 5A:
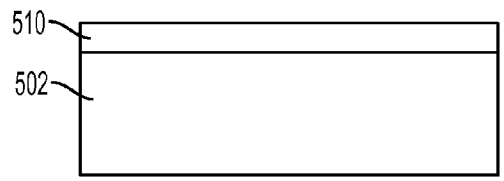
FIGS. 5A-5F are schematic side views illustrating the formation of lines in different layers of a thin film photovoltaic solar panel, consistent with an embodiment.
Figure 5B:
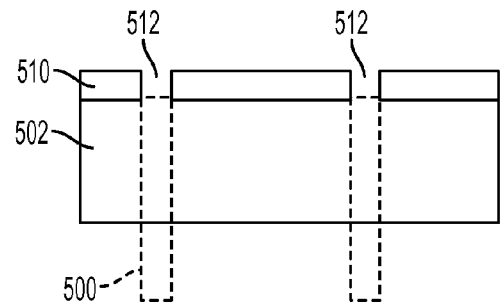

The laser machining system 100 may be used to scribe lines in large panels such as solar panels. Referring to FIGS. 5A-5F, one method of scribing lines in a thin film photovoltaic (PV) solar panel is described in greater detail. A first (P1) layer of conductive material 510 may be deposited on a substrate 502, such as glass or polyethylene terephthalate (PET) (FIG. 5A). The first layer 510 of conductive material may include a transparent conductive oxide including, but not limited to, indium tin oxide (ITO), indium zinc oxide (IZO), tin oxide (SnO) or zinc oxide (ZnO). The first layer 510 may then be scribed by directing one or more laser beams 500 through the substrate 502 to the first layer 510 to ablate a portion of the first layer 510 and form one or more scribe P1 scribe lines 512 (FIG. 5B). The scribe lines 512 may be spaced, for example, about 5-10 mm apart. The laser beam(s) 500 may have a wavelength (e.g., 1064 nm) and energy density sufficient to ablate the P1 layer 510 without damaging the substrate 502.

Figure 5C:
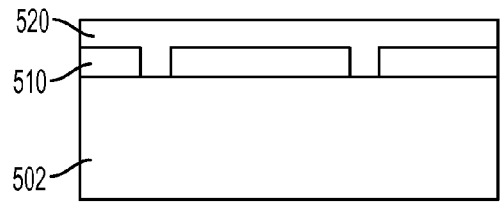
Figure 5D:
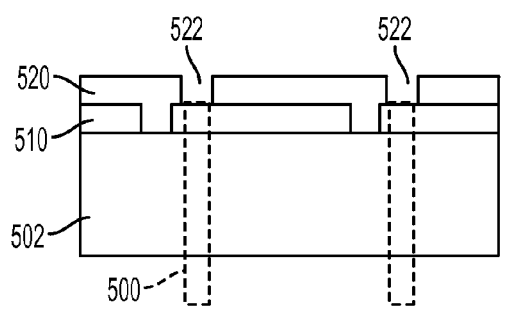

A second (P2) layer 520 of an active semiconductor material may then be deposited on the first layer 510 and within the P1 scribe lines 512 formed in the first layer 510 (FIG. 5C). The semiconductor material of the second layer 520 may include, without limitation, amorphous silicon (aSi), cadmium telluride (CdTe), copper indium gallium diselenide (CIGS), or copper indium diselenide (CIS). The second layer 520 may then be scribed by directing one or more laser beams 500 through the substrate 502 and the first layer 510 to the second layer 520 to ablate a portion of the second layer 520 and form P2 scribe lines 522 (FIG. 5D). The laser beam(s) 500 may have a wavelength (e.g., 532 nm) and energy density sufficient to ablate the P2 layer 520 without damaging the substrate 502 and the P1 layer 510.

Figure 5E:
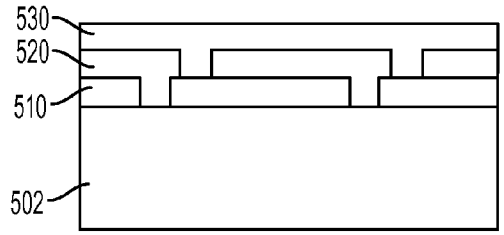
Figure 5F:
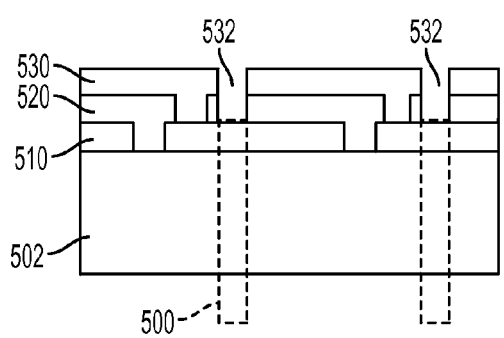

A third (P3) layer 530 of a metal may then be deposited on the second layer 520 and in the P2 scribe lines 522 formed in the second layer 520 (FIG. 5E). The conductive material of the third layer 530 may include a metal including, but not limited to, aluminum (Al), molybdenum, Mo, silver (Ag), or chromium (Cr). The second and third layers 520, 530 may then be scribed by directing one or more laser beams 500 through the substrate 502 to the second layer 520 and third layer 530 to ablate a portion of the second and third layers 520, 530 and form P3 scribe lines 532 (FIG. 5F). The laser beam(s) 500 may have a wavelength (e.g., 532 nm) and energy density sufficient to ablate the P2 and P3 layers 520, 530 without damaging the substrate 502 and the P1 layer 510.

The area with the lines 512, 522, 532 scribed in the P1-P3 layers 510, 520, 530 does not contribute toward solar energy conversion and is often referred to as a wasted or dead area. The lines 512, 522, 532 should be scribed and aligned accurately to minimize this dead area and provide the best efficiency of the solar panel. Embodiments of the laser machining system and method described herein are capable of forming the laser beams 500, directing laser beams 500 up through the substrate, and moving or scanning the beams 500 across the substrate to form the scribe lines 512, 522, 532 accurately. Embodiments of the laser machining system and method described herein may also be used to scribe the lines 512, 522, 532 from the top or film side by moving or scanning beams directed at the layers 510, 520, 530. In particular, the laser scanning stages and optical heads described herein are capable of providing force cancellation to reduce parasitic errors while increasing the number of scribing beams, thereby forming multiple scribe lines simultaneously and accurately.

Figure 6:
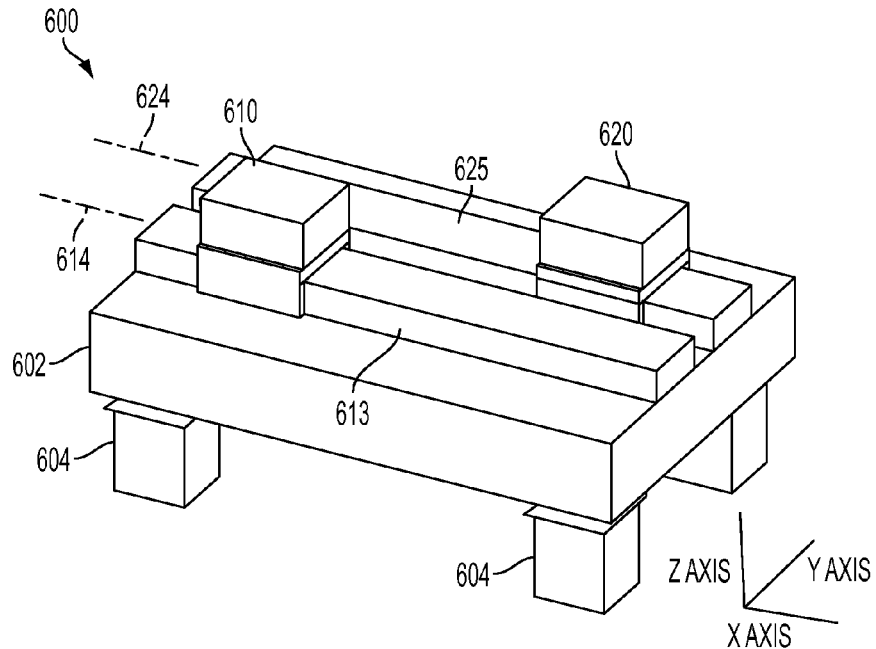
FIG. 6 is a schematic perspective view of an embodiment of a dual laser scanning stage system providing force cancellation in a laser machining system.
Figure 7:
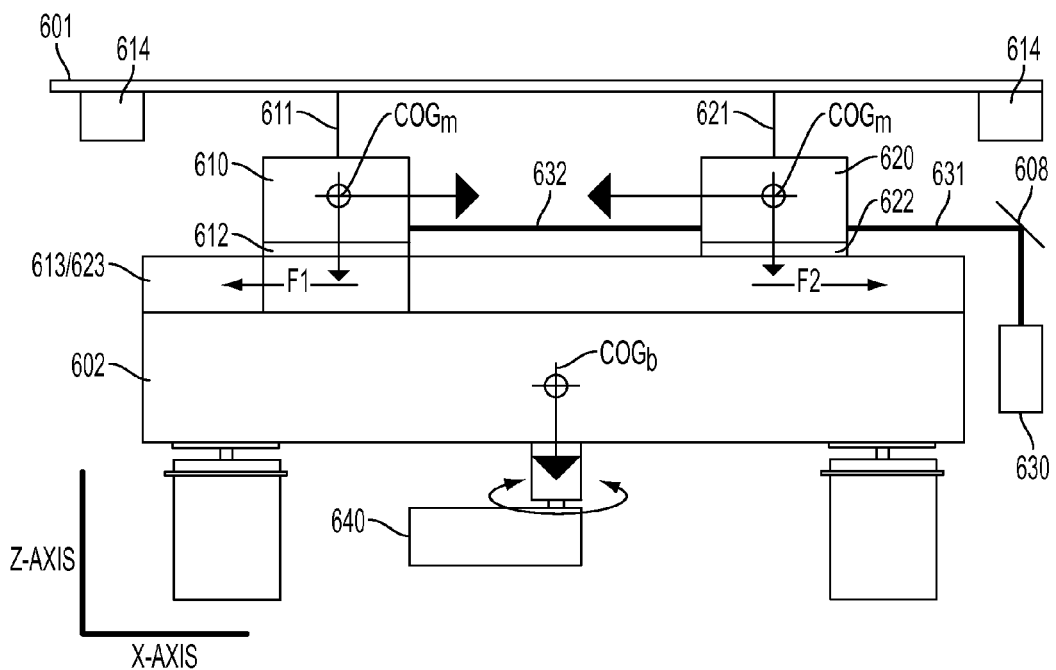
FIG. 7 is a schematic side view of an embodiment of a laser machining system including a dual laser scanning stage system arranged below a workpiece.
Figure 8:
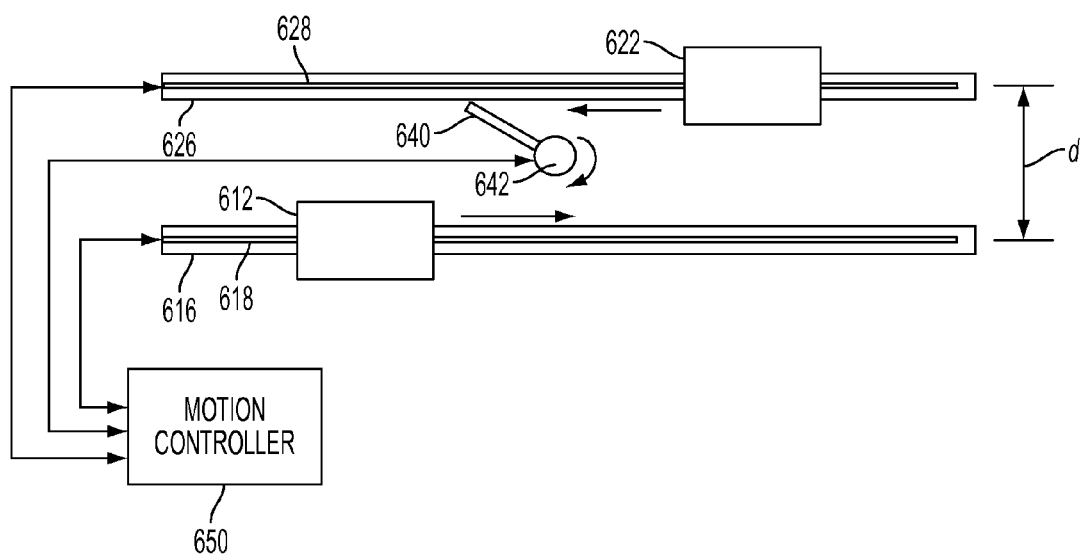
FIG. 8 is a schematic top view of an embodiment of a dual laser scanning stage system with motion control.

Referring to FIGS. 6-8, a dual laser scanning stage system 600 may be used in a laser machining system to machine a workpiece (e.g., by scribing one or more lines) while providing force cancellation. The dual laser scanning stage system 600 includes first and second optical heads 610, 620 on first and second laser scanning stages 612, 622. The laser scanning stages 612, 622 may be mounted for linear motion along rails or tracks 613, 623 on an isolated support base 602. The granite base 602 may be supported on passive isolators 604, for example, at each corner. As will be described in greater detail below, the laser scanning stages 612, 622 move with equal and opposite motion to provide force cancellation. The scanning stages 612, 622 may include high speed precision air bearing systems and a motion control system for controlling the equal and opposite motion.

The optical heads 610, 620 on the scanning stages 612, 622 each include a beam delivery system (not shown). As shown in FIG. 7, one or more laser sources 630 generates first and second laser beams 631 that are directed into the optical heads 610, 620. The beam delivery systems modify the respective beams 631, 632 and direct the modified beams 611, 621 toward a workpiece 601. The optical heads 610, 620 may be located beneath a workpiece support surface 614 on a part handling system such that the optical heads 610, 620 are located beneath the workpiece 601 and the modified beams 611, 621 are directed upward to the workpiece 601. One embodiment of the beam delivery systems split the beams into multiple beamlets that are directed to the workpiece 601 as the optical heads 610, 620 are moved by the scanning stages 612, 622 in opposite directions. The optical heads 610, 620 and scanning stages 612, 622 may be designed to each have substantially the same mass.

A stationary beam delivery system including, for example, one or more minors or reflectors 608, may be used to direct the laser beams 631, 632 to the optical heads 610, 620. In one embodiment, separate laser sources 630 may be used for each of the optical heads 610, 620 and the laser beams 631, 632 may be directed into the moving optical heads 610, 620 from the same direction or opposite directions. In another embodiment, a single laser source may be used to generate a raw laser beam that is split into multiple beams that are directed into the respective optical heads 610, 620.

The laser source 630 may be chosen to provide selective material removal without being destructive to other layers or the substrate. As discussed above, for example, the second (P2) layer should be selectively removed without damaging the first (P1) layer. In particular, the wavelength of the laser may vary depending upon the characteristics of the material being removed. The pulse width may also vary depending upon the type and thickness of material and may generally range between about 5 ps (or less) and about 500 ns (or less) and the frequency may be in the range of about 30 kHz to 1 MHz. The use of ultra fast and subpicosecond provide a precise material removal rate and allow depth control, for example, when scribing the P2 and P3 lasers described above.

The scanning stages 612, 622 are movable with equal and opposite motion along substantially parallel scanning axes (i.e., along X axes) 614, 624 such that the moving mass along each of the scanning axes 614, 624 is substantially the same. In other words, as the first scanning stage 612 translates from left to right, the second scanning stage 622 translates from right to left with substantially the same acceleration, velocity, and distance relative to the center of gravity of the base ($COG_b$). Thus, the reaction forces generated by movement of the scanning stages 612, 622 in the direction of the scanning axes 614, 624 substantially cancel out.

More specifically, the motion profile for each of the scanning stages 612, 622 may be a constant velocity from one side to the other side and back again (i.e., a scanning motion). This scanning motion may be repeated during machining. This type of scanning motion of a mass on a support base may create different types of torque. In particular, the force needed to accelerate the load to its constant velocity acts on the base 602 (e.g., the granite base) in a direction of the X axis and creates a torque (e.g., about the Y axis) on the base 602 equal to the force times the vertical distance between the center of gravity of the moving mass ($COG_m$) and the center of gravity of the base ($COG_b$). Without force cancellation, a moment in this direction will cause the isolators 604 on one side to compress, pitching the base 602 in the direction of the torque. The weight of the moving mass in the direction of the Y axis also creates a differential torque (about the Y axis) on the base as the moving mass changes positions relative to the $COG_b$.

Moving the laser scanning stages 612, 622 with equal and opposite motion reduces or substantially eliminates these moments of force. By moving the scanning stages 612, 622 in opposite directions with the same acceleration, as shown in FIG. 7, the same forces F1, F2 act on the base 602 in opposite directions along the X axis and the resulting force in the direction of the X axis is approximately zero, thereby substantially eliminating the moment that results from reaction forces in the X axis. The scanning stages 612, 622 are also moved symmetrically with respect to the center of gravity $COG_b$ of the base 602 (i.e., maintaining the same distance from $COG_b$), thereby eliminating the differential torque caused by the weight being applied by the stages 612, 122 in the direction of the Z axis. In addition to minimizing the forces in the direction of the X axis, using two (or more) laser scanning stages 612, 622 and optical heads 610, 620 doubles the amount of laser scribing in a given scan time and decreases the amount of time needed for scribing a workpiece.

Although torque about the Y axis is substantially eliminated by the scanning stages 612, 622 moving with equal and opposite motion, other moments may exist about the Z axis when the scanning stages 612, 622 move with equal and opposite motion. The scanning stages 612, 622 are spaced apart by a distance d (see FIG. 8), and the distance d may be minimized to minimize the torque moment about the Z axis. In another embodiment, a center of gravity (COG) moving device 640, such as a flipper, may be used to further decrease any moment about the Z axis that might be generated by the equal and opposite motion of the scanning stages 612, 622 (see FIGS. 7 and 8). The COG moving device 640 may pivot about a Z axis such that the device counters the moment that results during acceleration and deceleration of the opposing scanning stages 612, 622 with optical heads 610, 620. In one embodiment, therefore, the sum of the forces in all six degrees of freedom equals approximately zero.

Figure 7A:
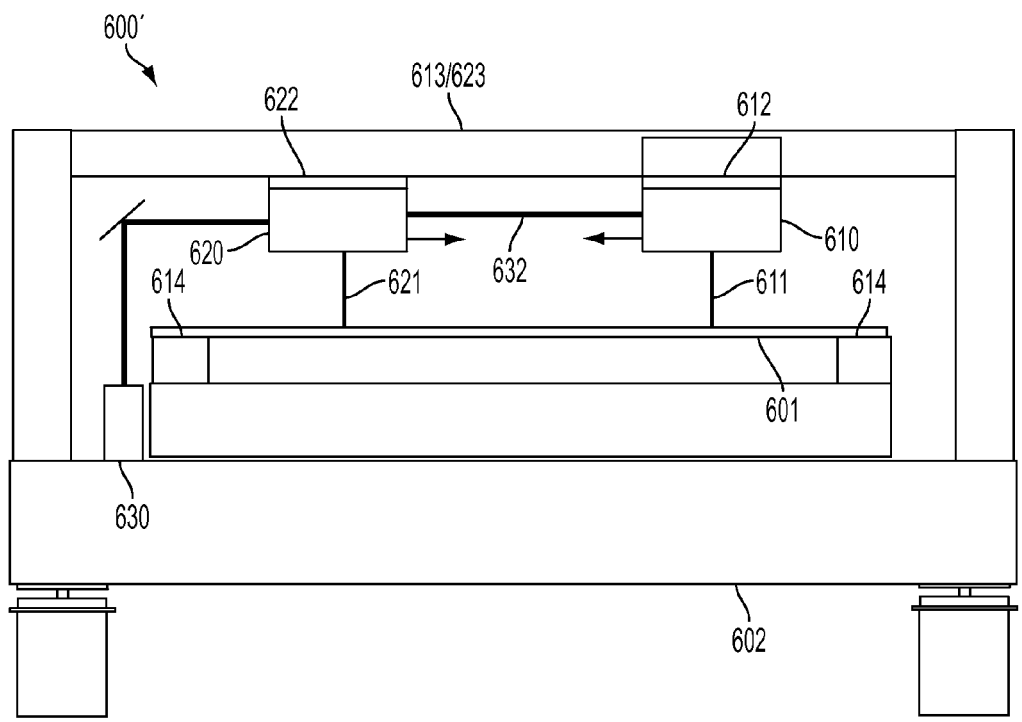
FIG. 7A is a schematic side view of an embodiment of a laser machining system including a dual laser scanning stage system arranged above a workpiece.

According to another embodiment, as shown in FIG. 7A, a dual laser scanning stage system 600' may be mounted above a workpiece in a laser machining system. In this embodiment, the optical heads 610, 620 and laser scanning stages 612, 622 may be substantially the same as described above but inverted. For example, the laser scanning stages 612, 622 may be mounted for linear motion along tracks 613, 623 that are supported above the workpiece 601. As such, the modified laser beams 611, 621 are directed downward from the optical heads 610, 620 toward the workpiece supported on the workpiece support surfaces 614 below the optical heads 610, 620.

As shown in FIG. 8, a motion system may be used to control movement of the laser scanning stages 612, 622 with equal and opposite motion. The motion system may include one or more linear motion devices for providing linear motion, position feedback systems for providing position feedback, and a motion controller for controlling the linear motion devices in response to the position feedback. In one embodiment, the laser scanning stages 612, 622 may be linear air bearing stages moved with a precision air bearing linear motion system capable of speeds up to 2.5 m/sec or greater, such as the type that are commercially available. In an air bearing system, air is pumped to the interface between the stages 612, 622 and the tracks 613, 623 such that the stages float on a thin film of air.

As shown in FIG. 8, the precision air bearing linear motion system may include linear motors 616, 626 to provide the linear motion and linear encoders 618, 628 to provide position feedback for the stages 612, 622. A motion controller 650 may be coupled to the linear motors 616, 626 and linear encoders 618, 628 to control the motion of the stages 612, 622 in response to position, velocity and/or acceleration data. For example, the motion controller 650 may determine velocity and/or acceleration from the position data obtained from the linear encoders 618, 628 and may control the linear motors 616, 626 to provide the equal and opposite motion of the stages 612, 622 described above. Other linear motion devices may also be used, such as a servomotor with ball screw or lead screw and other position feedback systems may be used.

The COG moving device 640 may be coupled to a rotary motor, such as a servomotor, to pivot the COG moving device 640. The motion controller 650 may also be coupled to the motor 642 to control the pivoting of the COG moving device 640 in a manner that counters the moment that results from acceleration and deceleration of the stages 612, 622.

Although two laser scanning stages are shown, other numbers of scanning stages may also be used to provide scribing and force cancellation. Although the embodiment described herein is a laser machining system with laser scanning stages moving with equal and opposite motion, the force cancellation techniques described herein may also be used in other types of systems with motion stages that move in a linear direction.

Figure 9:
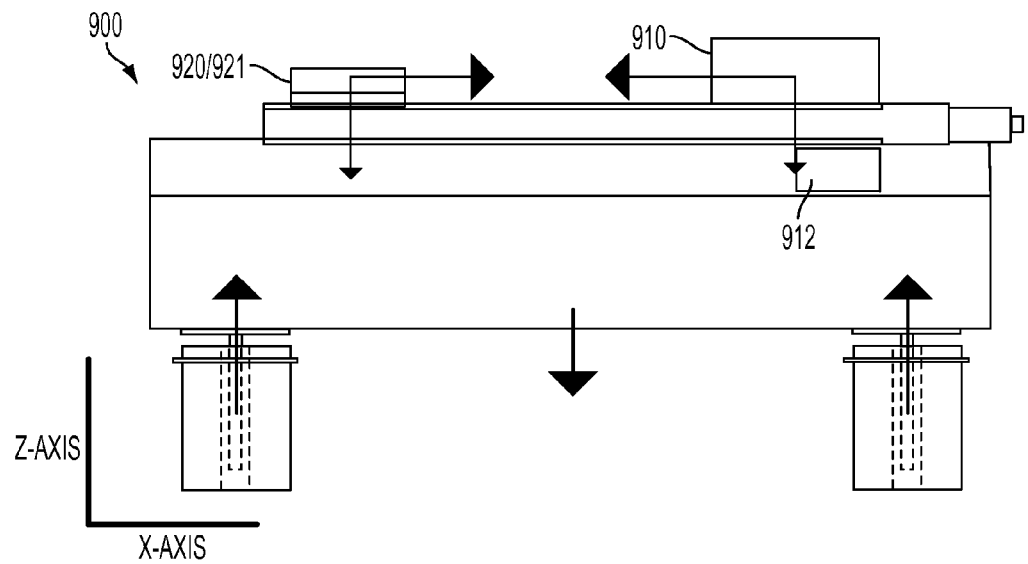
FIG. 9 is a schematic side view of an embodiment of a single laser scanning stage with dual moving mass system for use in a laser machining system.
Figure 10:
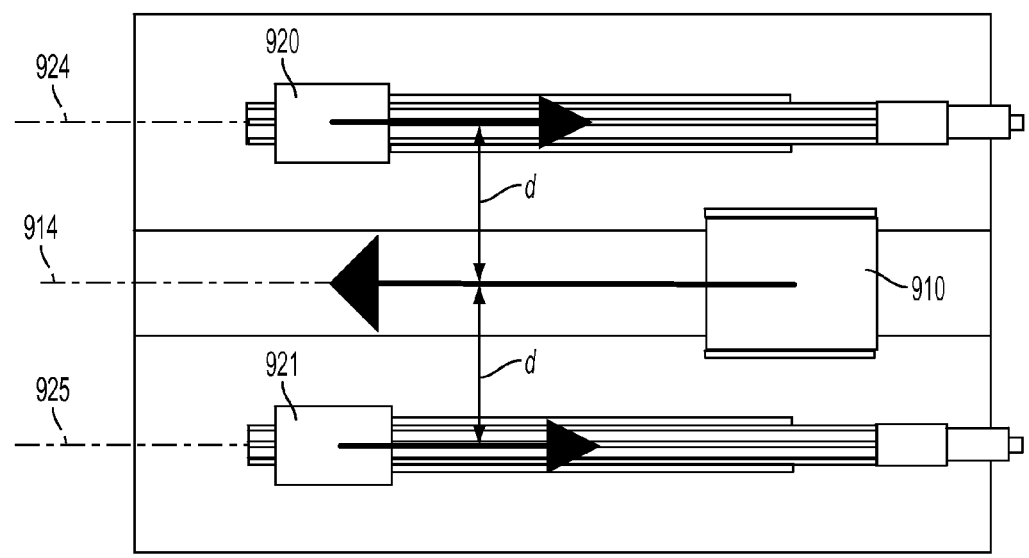
FIG. 10 is a schematic top view of the single laser scanning stage with dual moving mass system.

Referring to FIGS. 9 and 10, a single laser scanning stage with dual moving mass system 900 may be used in a laser machining system, consistent with another embodiment. The single laser scanning stage with dual moving mass system 900 may include a single optical head 910 with scanning stage 912 and two symmetric but opposite mass followers 920, 921. The mass followers 920, 921 may each have a moving mass that is one-half the moving mass represented by the scanning stage 912 with optical head 910. The optical head 910 and scanning stage 912 move along a scanning axis 914 and the mass followers 920, 921 move with equal and opposite motion along parallel follower axes 924, 925. The mass followers 920, 921 thus substantially eliminate the moments about the Y axis in the same way as described above.

In this embodiment, however, the use of mass followers 920, 921 on opposite sides of the scanning stage 912 also substantially eliminates a moment about the Z axis. In particular, the first mass follower 920 creates a torque in one direction about the Z axis that is equal to the mass of the mass follower 920 times the distance d from the follower axis 924 to the scanning axis 914. The second mass follower 921 creates a torque in the opposite direction about the Z axis that is equal to the mass of the mass follower 921 times the distance d from the follower axis 925 to the scanning axis 914. By placing the center of gravity of the combined moving mass followers 920, 921 directly opposing the center of gravity of the moving mass of the scanning stage 912, therefore, the two opposing moments substantially cancel each other.

The scanning stage 912 may be a linear air bearing stage moved with a precision air bearing linear motion system such as the type described above. The mass followers 920, 921 may be moved by a linear motion system such as a linear motor or a servomotor with lead screw or ball screw. Position feedback systems may be used to provide position feedback for the scanning stage 912 and the mass followers 920, 921. A motion controller may control the linear motion systems in response to the position feedback to provide the equal and opposite motion, as described above.

Although one laser scanning stage and two mass followers are shown, other numbers of scanning stages and mass followers may also be used to provide scribing and force cancellation. This force cancellation technique may also be used in other types of systems with motion stages that move in a linear direction.

According to a further embodiment, a dual laser scanning stage system may include first and second laser scanning stages that move together and a single mass follower that moves equal and opposite to the laser scanning stages. In such an embodiment, the single mass follower has a mass that is substantially equivalent to the moving mass of the dual laser scanning stages. Similar to the single laser scanning stage with dual moving mass system, this embodiment has the advantage of canceling the moments about the Z axis. According to yet another embodiment, three laser scanning stages may be used—two smaller laser scanning stages each having ½ the mass of one larger laser scanning stage moving with equal and opposite motion. Various combinations of moving laser scanning stages and/or mass followers may be used to provide force cancellation.

Figure 11:
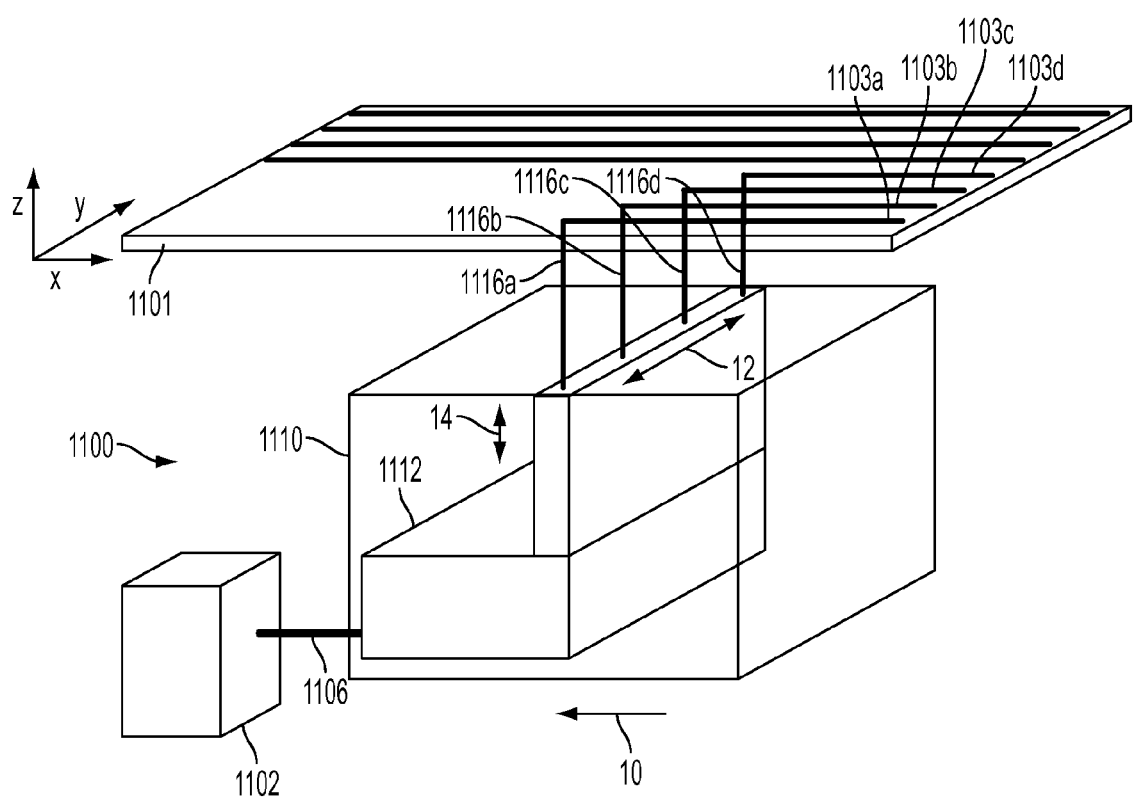
FIG. 11 is a schematic perspective view of an embodiment of a beam delivery system for use in an optical head on a laser scanning stage.

FIG. 11 shows an embodiment of a moving optical head 1110 that may be used in the systems described above to form multiple scribe lines on a workpiece 1101. The moving optical head 1110 may include a beam delivery system 1112 that splits a laser beam 1106 from a laser source 1102 into multiple beamlets 1116a-1116d and images the beamlets 1116a-1116d onto a workpiece 1101. A stationary beam delivery system (not shown) may deliver the laser beam 1106 from the laser source 1102 to the moving optical head 1100.

The optical head 1110 is moved linearly (e.g., in the direction of arrow 10) such that the beamlets 1116a-1116d form substantially parallel scribe lines 1103a-1103d along the workpiece 1101 as the optical head moves. The optical head 1100 may be mounted, for example, on a laser scanning stage that moves in both directions along a scanning axis (e.g., the X axis), as described above. The laser beam 1106 from the laser source 1102 is directed into the optical head 1110 substantially parallel to the linear axis of motion (i.e., the scanning axis) and the multiple beamlets 1116a-1116d are directed out of the optical head 1100 substantially orthogonal to the scanning axis.

The beam delivery system 1112 may include various components for routing the laser beam 1106 and/or beamlets 1116a-1116d and for controlling the shape, size, uniformity, and strength of the beam 1106 and/or beamlets 1116a-1116d. The components (not shown) of the beam delivery system 1112 may include, but are not limited to, a beam splitter for splitting the beam 1106 into the beamlets 1116a-1116d, a mask for shaping the beam 1106 or beamlets 1116a-1116d, a homogenizer for homogenizing the beam 1106 or beamlets 1116a-1116d, reflectors for routing and/or adjusting optical path lengths of the beamlets 1116a-1116d, and imaging optics for imaging the mask shape on a process plane of the workpiece 1101. As used herein, the "process plane" refers to a plane on or in the workpiece where the laser is directed to machine the workpiece, for example, by causing ablation. Examples of the beam delivery systems that may be used are described in greater detail in U.S. patent application Ser. No. 12/576,504 entitled LASER MACHINING SYSTEMS AND METHODS WITH MULTIPLE BEAMLET LASER BEAM DELIVERY SYSTEM, which is filed concurrently herewith and fully incorporated herein by reference.

One or more of the components of the beam delivery system 1112 may be capable of adjusting the beam 1106 and/or beamlets 1116a-1116d, thereby adjusting the scribe lines 1103a-1103d formed on the workpiece 1101. The positioning of the beamlets 1116a-1116d may be adjusted, for example, by moving a mask, beam splitter or other components in the direction of arrow 12 orthogonal to the scanning axis (i.e., along the Y axis). The focus of the beamlets 1116a-1116d may be adjusted, for example, by moving the imaging optics in the direction of arrow 14 along the beamlet axes (i.e., the Z axis). The fluence of the beamlets 1116a-1116d may be adjusted, for example, by adjusting the attenuation of the beam 1106 or beamlets 1116a-1116d.

Figure 12:
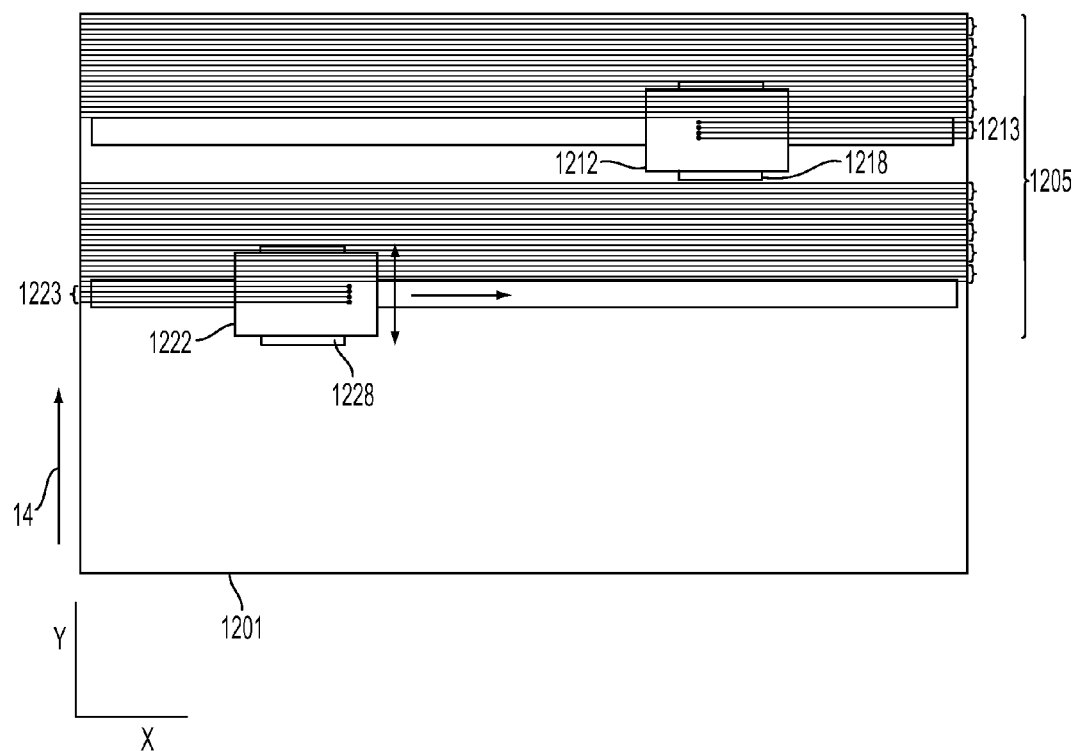
FIG. 12 is a schematic top view of a dual laser scanning stage system with one or more adjustable scanning axes and with dual optical heads forming sets of scribe lines, consistent with another embodiment.

In any of the embodiments described above, one or more of the optical heads may also be mounted on a stage that provides either manual or motorized movement across the scanning axis (e.g., along the Y axis). As shown in FIG. 12, for example, one or both of the optical heads 1212, 1222 may be mounted on Y axis stages 1218, 1228 providing manual or motorized movement along the Y axis in addition to the scanning stages that scan along the X axis. In other words, one or both of the scanning axes of the optical heads 1212, 1222 may be adjusted along the Y axis. The Y axis stage(s) 1218, 1228 allows one or both of the scanning axes of the optical heads 1212, 1222 to be adjusted relative to each other, for example, so that the scribe lines formed by one optical head 1222 are aligned or registered relative to the scribe lines formed by the other optical head 1212.

In one embodiment, one optical head 1212 may have a fixed scanning axis and the other optical head 1222 may have an adjustable scanning axis. The workpiece 1201 may be aligned relative to the optical head 1212 with the fixed scanning axis and the scanning axis of the other optical head 1222 may be adjusted relative to the fixed scanning axis of the optical head 1212 to provide a desired spacing of the sets of scribe lines formed simultaneously by the respective optical heads 1212, 1222.

Where multiple optical heads are moving simultaneously, the optical heads are generally not spaced closely enough to form adjacent sets of scribe lines with the desired spacing. The multiple optical heads may thus interdigitate the sets of scribe lines and/or the individual scribe lines to form the scribe lines with the desired spacing across an entire workpiece.

As shown in FIG. 12, for example, one optical head 1212 forms a set 1213 of scribe lines while the other optical head 1222 forms another set 1223 of scribe lines spaced apart therefrom. The workpiece 1201 may be indexed in the direction of arrow 14 such that both optical heads 1212, 1222 form the respective sets of scribe lines adjacent to previous sets of scribe lines until scribe lines are formed with the desired spacing throughout a region 1205 on the workpiece 1201. To maintain a consistent spacing of the scribe lines throughout the region 1205, the scribe lines formed by the optical head 1222 should be aligned or registered with the scribe lines formed by the optical head 1212. If the optical heads 1212, 1222 form scribe lines at 10 mm, for example, the 10 mm spacing should be consistent between the sets of scribe lines formed by the separate optical heads 1212, 1222. In this example, the scanning axis of the optical head 1220 may be adjusted such that the sets of scribe lines formed by the optical head 1220 are aligned or registered on the same grid as the sets of scribe lines formed by the optical head 1212.

Figure 12A:
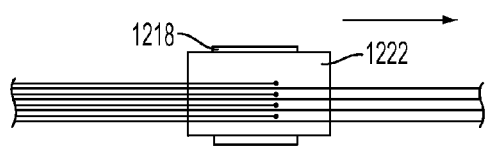
FIG. 12A is a schematic top view of an optical head forming a set of scribe lines overlaying a set of scribe lines previously formed by another optical head, consistent with a further embodiment.

In another example, shown in FIG. 12A, the scanning axis of the optical heads 1212, 1222 may be positioned relative to each other such that one optical head 1222 forms scribe lines that overlay scribe lines formed by the other optical head. If each of the optical heads forms scribe lines spaced at 10 mm, for example, the scanning axis of the optical head 1222 may be positioned such that the scribe lines will be overlayed with a spacing of 5 mm.

Accordingly, the laser machining systems and methods describe herein provide force cancellation by moving masses linearly with equal and opposite motion. Such a force cancellation technique allows high speed scribing with minimal parasitic errors. When multiple optical heads are moving to provide force cancellation, the laser machining system simultaneously increases the production capacity (i.e., more lines are scribed at one time) and the accuracy.

Consistent with one embodiment, a laser machining system includes a part handling system including a workpiece support surface for supporting a workpiece to be machined, at least one laser source, and at least first and second laser scanning stages positioned relative to the part handling system for linear movement along substantially parallel scanning axes. At least first and second optical heads are located on the first and second laser scanning stages, respectively. The first and second optical heads include respective first and second beam delivery systems for receiving respective first and second laser beams, modifying the laser beams, and directing the modified laser beams to a workpiece supported on the workpiece support surface while the scanning stages are moving. The laser machining system further includes a motion system for controlling movement of the scanning stages along the scanning axes with substantially equal and opposite motion.

Consistent with another embodiment, a laser machining system includes a part handling system including a workpiece support surface for supporting a workpiece to be machined, at least one laser source for generating at least one laser beam, at least one laser scanning stage positioned relative to the part handling system for linear movement along a scanning axis, and at least one optical head located on the laser scanning stage. The optical head includes a beam delivery system for receiving the beam, modifying the beam, and directing the modified beam to a workpiece supported on the workpiece support surface. At least first and second symmetric mass followers are positioned for linear movement along follower axes substantially parallel to the scanning axis. The laser machining system further includes a motion system for controlling movement of the scanning stage along the scanning axis and for controlling movement of the mass followers substantially equal and opposite to the motion of the scanning stage.

Consistent with a further embodiment, a method of laser machining a workpiece includes: generating at least one laser beam; directing the at least one laser beam into at least a first optical head on at least a first laser scanning stage; modifying the laser beam within the first optical head such that at least one modified beam is directed out of the optical head and at the workpiece; moving at least the first laser scanning stage along at least a first scanning axis resulting in a first moving mass, wherein the at least one modified beam directed out of the first optical head at the workpiece scribes the workpiece as the first laser scanning stage moves; and moving a second moving mass along at least one axis substantially parallel to the first scanning axis, the second moving mass being substantially equivalent to the first moving mass, and wherein the first and second moving masses move with substantially equal and opposite motion.

Consistent with yet another embodiment, a dual laser scanning stage system includes at least first and second laser scanning stages positioned relative to a part handling system for linear movement along substantially parallel scanning axes, and at least first and second optical heads located on the first and second laser scanning stages, respectively. The first and second optical heads include respective first and second beam delivery systems for receiving respective first and second laser beams, modifying the laser beams, and directing the modified laser beams to a workpiece supported on the workpiece support surface while the scanning stages are moving. The laser machining system further includes a motion system for controlling movement of the scanning stages along the scanning axes with substantially equal and opposite motion.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser machining system comprising:
a part handling system including a workpiece support surface for supporting a workpiece to be machined;
at least one laser source;
at least first and second laser scanning stages positioned relative to the part handling system for linear movement along substantially parallel scanning axes;
at least first and second optical heads located on the first and second laser scanning stages, respectively, the first and second optical heads including respective first and second beam delivery systems for receiving respective first and second laser beams, modifying the laser beams, and directing the modified laser beams to a workpiece supported on the workpiece support surface while the scanning stages are moving; and
a motion system for controlling movement of the scanning stages along the scanning axes with substantially equal and opposite motion.

2. The laser machining system of claim 1 wherein the part handling system, the scanning stages and the optical heads are arranged such that the optical heads are located below the workpiece support surface.

3. The laser machining system of claim 1 wherein the part handling system, the scanning stages and the optical heads are arranged such that the optical heads are located above the workpiece support surface.

4. The laser machining system of claim 1 further comprising a center of gravity moving device pivotable about an axis substantially perpendicular to the scanning axes.

5. The laser machining system of claim 1 wherein each of the beam delivery systems is configured to modify the respective first and second laser beams by splitting the laser beams into multiple beamlets.

6. The laser machining system of claim 5 wherein each of the beam delivery systems is configured to shape and image the beamlets onto a workpiece.

7. The laser machining system of claim 1 wherein the motion system comprises:
first and second linear motors coupled to the first and second laser scanning stages, respectively, for providing linear motion;
first and second position feedback systems for providing position feedback for the respective first and second laser scanning stages; and
a motion controller for controlling linear motion of each of the laser scanning stages in response to the position feedback.

8. The laser machining system of claim 1 wherein the laser source includes first and second lasers for generating the first and second laser beams.

9. The laser machining system of claim 1 wherein the laser source includes a single laser for generating a single laser beam, and further comprising a beam delivery system for splitting the single laser beam to generate the first and second laser beams.

10. The laser machining system of claim 1 further comprising a base and an isolation mechanism coupled to the base, wherein the base supports at least the part handling system, the laser scanning stages, and the optical heads.

11. A laser machining system comprising:
a part handling system including a workpiece support surface for supporting a workpiece to be machined;
at least one laser source for generating at least one laser beam;
at least one laser scanning stage positioned relative to the part handling system for linear movement along a scanning axis;
at least one optical head located on the laser scanning stage, the optical head including a beam delivery system for receiving the beam, modifying the beam, and directing the modified beam to a workpiece supported on the workpiece support surface while the at least one laser scanning stage is moving;
at least first and second symmetric mass followers positioned for linear movement along follower axes substantially parallel to the scanning axis; and
a motion system for controlling movement of the scanning stage along the scanning axis and for controlling movement of the mass followers substantially equal and opposite to the motion of the scanning stage.

12. The laser machining system of claim 11 wherein each of the mass followers has a moving mass that is substantially one-half a moving mass of the optical head and scanning stage.

13. The laser machining system of claim 11 wherein the part handling system, the scanning stages and the optical heads are arranged such that the optical heads are located below the workpiece support surface.

14. The laser machining system of claim 11 further comprising a base and an isolation mechanism coupled to the base, wherein the base supports at least the part handling system, the laser scanning stage, and the optical head.

15. A method of laser machining a workpiece, the method comprising:
generating at least one laser beam;
directing the at least one laser beam into at least a first optical head on at least a first laser scanning stage;
modifying the laser beam within the first optical head such that at least one modified beam is directed out of the optical head and at the workpiece;
moving at least the first laser scanning stage along at least a first scanning axis resulting in a first moving mass, wherein the at least one modified beam directed out of the first optical head at the workpiece scribes the workpiece as the first laser scanning stage moves; and
moving a second moving mass along at least one axis substantially parallel to the first scanning axis, the second moving mass being substantially equivalent to the first moving mass, and wherein the first and second moving masses move with substantially equal and opposite motion.

16. The method of claim 15 further comprising:
directing the laser beam into a second optical head on a second laser scanning stage;
modifying the laser beam within the second optical head such that at least one modified beam is directed out of the second optical head and at the workpiece; and
wherein moving the second moving mass includes moving the second laser scanning stage along a second scanning axis substantially parallel to the first scanning axis, wherein the at least one modified beam directed out of the second optical head at the workpiece scribes the workpiece as the second laser scanning stage moves.

17. The method of claim 15 wherein moving the second moving mass includes moving first and second mass followers along first and second follower axes substantially parallel to the first scanning axis.

18. The method of claim 15 wherein modifying the beam includes splitting the beam into multiple beamlets.

19. The method of claim 15 wherein modifying the beam includes passing the beam through a mask to shape the beam and imaging the shaped beam on the workpiece.

20. The method of claim 15 wherein directing the laser beam into the optical head includes directing the laser beam into a side region of at least one optical head, wherein modifying the laser beam includes modifying the beam within the optical head such that at least one modified beam is directed out of a top region of the optical head, and wherein the optical head is moved beneath the workpiece such that the at least one modified beam scans the workpiece and ablates a portion of the workpiece to form a scribe line in the workpiece.

21. A dual laser scanning stage system comprising:
at least first and second laser scanning stages positioned relative to a part handling system for linear movement along substantially parallel scanning axes;
at least first and second optical heads located on the first and second laser scanning stages, respectively, the first and second optical heads including respective first and second beam delivery systems for receiving respective first and second laser beams, modifying the laser beams, and directing the modified laser beams to a workpiece supported on the workpiece support surface while the scanning stages are moving; and
a motion system for controlling movement of the scanning stages along the scanning axes with substantially equal and opposite motion.

* * * * *